(12) United States Patent
Truong

(10) Patent No.: US 8,300,013 B2
(45) Date of Patent: Oct. 30, 2012

(54) MOUSE WITH A FINGER TRIGGERED SENSOR

(76) Inventor: Duc Phu Truong, West Covina, CA (US)

( * ) Notice: Subject to any disclaimer, the term of this patent is extended or adjusted under 35 U.S.C. 154(b) by 674 days.

(21) Appl. No.: 11/953,045

(22) Filed: Dec. 8, 2007

(65) Prior Publication Data

US 2009/0146955 A1    Jun. 11, 2009

(51) Int. Cl.
 *G06F 3/033* (2006.01)
 *G06F 3/02* (2006.01)
 *G06F 17/00* (2006.01)
 *G09G 5/08* (2006.01)
(52) U.S. Cl. ............ 345/163; 345/166; 345/168; 463/37
(58) Field of Classification Search .......... 345/156–157, 345/163–166, 168–170, 172, 175; 463/36–37; 715/769, 856, 866
See application file for complete search history.

(56) References Cited

U.S. PATENT DOCUMENTS

| 5,841,425 | A  | * | 11/1998 | Zenz, Sr. ........................ 345/163 |
| 7,154,480 | B2 | * | 12/2006 | Iesaka ............................. 345/173 |
| 7,168,047 | B1 | * | 1/2007  | Huppi ............................. 715/784 |
| 7,710,397 | B2 | * | 5/2010  | Krah et al. ..................... 345/163 |
| 2002/0084986 | A1 |   | 7/2002  | Armstrong |
| 2005/0035945 | A1 |   | 2/2005  | Keenan et al. |
| 2006/0132447 | A1 | * | 6/2006  | Conrad ........................... 345/168 |
| 2008/0106523 | A1 | * | 5/2008  | Conrad ........................... 345/173 |

OTHER PUBLICATIONS

International Search Report and Written Opinion in counterpart PCT application No. PCT/US2008/85255, dated Jan. 30, 2009.

* cited by examiner

*Primary Examiner* — Bipin Shalwala
*Assistant Examiner* — Keith Crawley
(74) *Attorney, Agent, or Firm* — Chen Yoshimura LLP

(57) ABSTRACT

A computer input device (e.g. a mouse) with a finger-triggered sensor is described. The sensor generates input signals in addition to the conventional mouse signals generated by click buttons, tracking device and scrolling wheel. The sensor may be an optical sensor, a touch-sensitive sensor or other types of sensors. The signals generated by the sensor, either alone or in combination with other signals generated by the buttons, tracking device or scrolling wheel, may be interpreted to generate various messages for the operating system and/or application programs. The interpretation may be performed by a circuit on the input device, by a driver program on the host computer, or both. The sensor may be provided on a mouse, a laptop keyboard that has a pointing device, an external keyboard equipped with a pointing device, or on a standalone device that can be electrically connected to a computer through its available ports.

6 Claims, 13 Drawing Sheets ns of the present invention provide a finger
MOUSE WITH A FINGER TRIGGERED SENSOR

BACKGROUND OF THE INVENTION

1. Field of the Invention

This invention relates to an input device for computers, and in particular, it relates to a mouse or other type of pointing devices with a sensor capable of being triggered by a finger.

2. Description of the Related Art

A conventional computer pointing device (also known as a mouse) has one or more click buttons for generating button signals, a wheel-type scrolling device for generating scrolling signals, and a movement tracking device for generating movement signals. Of the multiple buttons on a typical mouse, the left button is the most frequently used button because it carries out two of the most common software GUI (graphical user interface) operations, the first being selecting an object by clicking on it and the second being dragging an object by first clicking on it and holding the left button down while dragging the mouse to move the object from one location to another. While the object selection operation is quite easy, the dragging operation is a more difficult and error-prone mouse operation because the user has to hold down the left button during the whole dragging process. Other input operations may also benefit from a more ergonomic design of the input device to make user operation easier and less error prone.

SUMMARY OF THE INVENTION

The present invention is directed to a computer input device that substantially obviates one or more of the problems due to limitations and disadvantages of the related art.

Embodiments of the present invention provide a finger triggered sensor that works in conjunction with computer input devices such as pointing devices and keyboards to perform many common mouse operations more efficiently and ergonomically than conventional mice. The finger triggered sensor can be integrated into a keyboard or a computer pointing device (mouse), or it can be designed as a separate device and interacts with the keyboard or mouse operations through a software program installed onto the computer.

One application of the sensor is to provide an alternative method for dragging a graphical object on computer screen without pressing any mouse button at all. The dragging method of this invention makes use of a sensor with accompanied software and hardware to completely replace the left button, thus making the computer graphical object dragging process easier and safer.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a computer input device including a device movement tracking mechanism for tracking the movement of the computer input device; one or more buttons capable of being triggered by being depressed by a finger; and a sensor capable of being triggered by a finger.

In another aspect, the present invention provides a system including a computer input device and a host computer connected to the computer input device, the computer input device including: a device movement tracking mechanism for tracking the movement of the computer input device; one or more buttons capable of being triggered by being depressed by a finger; a sensor capable of being triggered by a finger; and a control circuit for detecting changes of states of the sensor and generating one or more signals, including a sensor-activated signal and a sensor-deactivated signal; and the host computer including a control section for receiving the sensor-activated and sensor-deactivated signals from the computer input device and for generating corresponding sensor-activated and sensor-deactivated messages.

The present invention also provides methods carried our by the above devices.

It is to be understood that both the foregoing general description and the following detailed description are exemplary and explanatory and are intended to provide further explanation of the invention as claimed.

BRIEF DESCRIPTION OF THE DRAWINGS

FIG. 1B shows the sensor covered state while FIG. 1A shows the sensor exposed state.

DETAILED DESCRIPTION OF THE PREFERRED EMBODIMENTS

Embodiments of the present invention provide a computer input device, commonly referred to as a mouse, that has a finger-triggered sensor for generating input signals in addition to the conventional button signals generated by click buttons, movement signals generated by the movement tracking device and scrolling signals generated by a scrolling wheel. More broadly, the sensor is a finger triggered sensor that detects the presence or movements of one or more fingers. As used in this disclosure, the word "finger" includes the thumb.

Figure 1A:
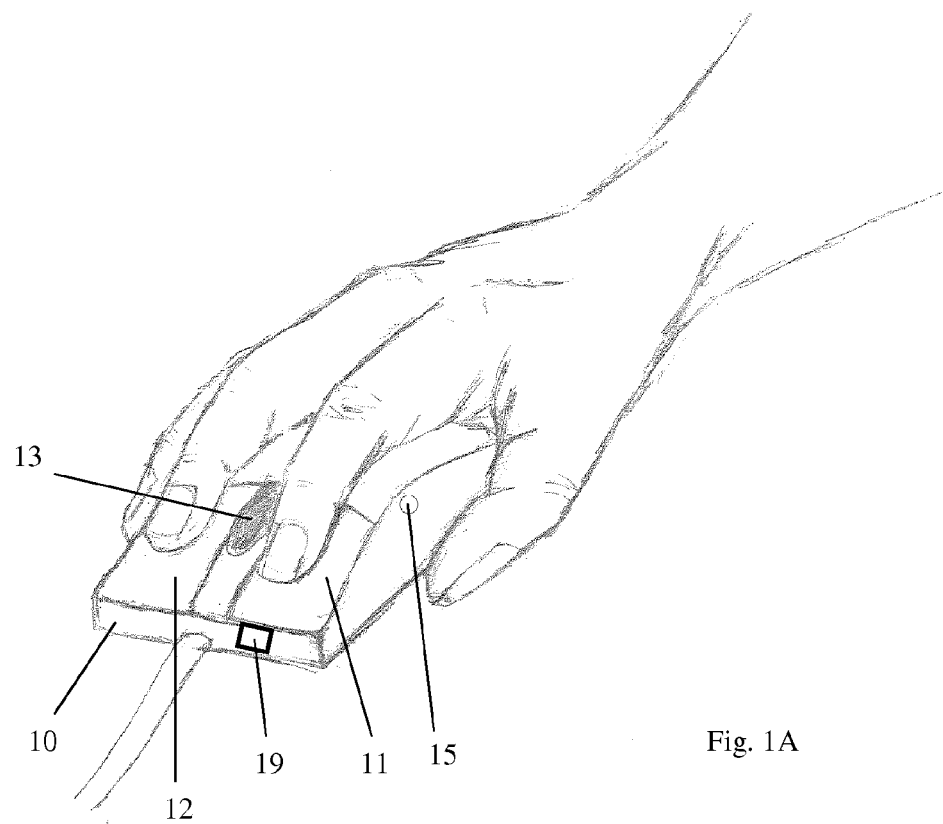
FIG. 1A depicts a mouse with a finger-triggered sensor according to an embodiment of the present invention.
Figure 1B:
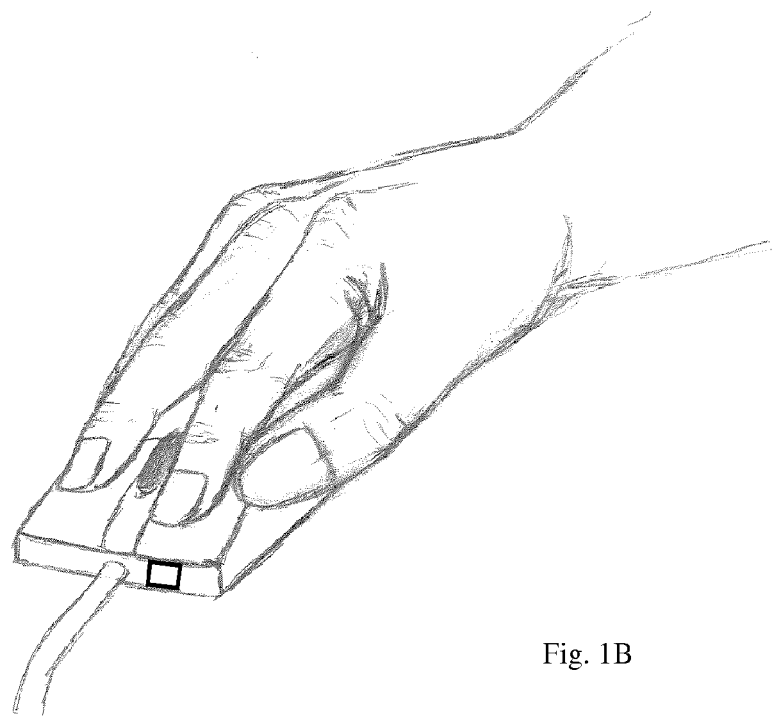
FIG. 1B illustrate the operation of the mouse of FIG. 1A according to an embodiment of the present invention.
Figure 2:
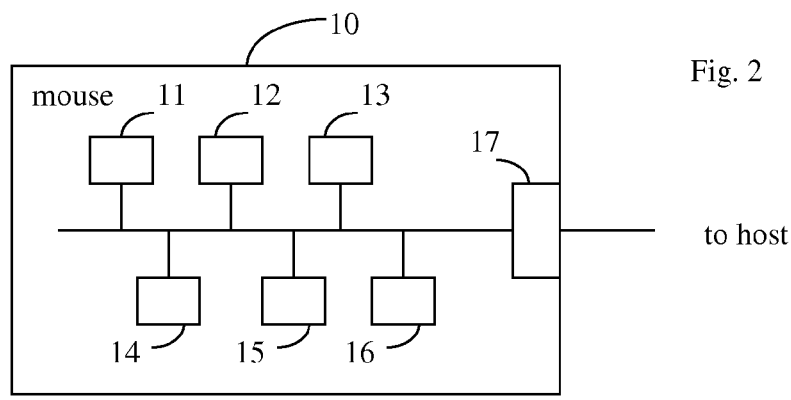
FIG. 2 is a schematic block diagram illustrating the components of the mouse of FIG. 1A.

As shown in FIGS. 1A, 1B and 2, a mouse 10 according to an embodiment of the present invention includes a left button 11, a right button 12 (optional), a scrolling wheel 13 (optional), a mouse movement tracking mechanism 14 (either mechanical or optical) (not shown in FIGS. 1A and 1B) for generating mouse movement signals, and a finger-triggered sensor 15. A control circuit 16 is provided to control the various components of the mouse, interpret the various signals generated by these components, and generate logical signals (sometimes referred to as messages in the programming context) to be transmitted to the host computer via an interface 17. Alternatively, the mouse 10 may transmit the signals generated by the various components 11 to 15 to the host computer, and the host computer is equipped with suitable circuits to interpret the signals and generate appropriate messages. The left button 11, right button 12, scrolling wheel 13 and mouse movement tracking mechanism 14 are conventional components and their structures are not described in further details here. The finger-triggered sensor 15 may be implemented as an optical sensor (e.g. one that uses an LED (light emitting diode)) which generates one sensor signal when it becomes covered by a finger from an exposed state, and/or generate another sensor signal when it becomes exposed from a covered state. The sensor 15 may also be implemented as a touch-sensitive sensor (e.g. one that uses a touch-sensitive pad) which generates one sensor signal when it is touched by a finger from an untouched state, and/or generate another sensor signal when the finger is removed from a touched state. Other implementations may also be possible, such as thermal sensors, etc. In the following descriptions, an optical sensor is used as an exemplary implementation, but the descriptions will apply to a touch-sensitive sensor or other implementations.

As shown in FIGS. 1A and 1B, a user typically holds the mouse 10 with the thumb and the small and/or ring fingers of a hand, and uses the index and middle fingers to press the left and right mouse buttons 11 and 12. A right-handed mouse is used as an example in the descriptions below, but the mouse may also be made as a left-handed device. According to embodiments of the present invention, the finger-triggered sensor 15 is located on the left side of the mouse 10 near where the thumb is typically placed when holding the mouse. In one embodiment, the finger-triggered sensor 15 is located in an area where it is normally exposed but can be covered by moving the thumb. For example, it may be located above the normal location of the thumb, as shown in FIG. 1A. A first sensor signal is generated when the thumb is moved to cover the sensor 15 as illustrated in FIG. 1B, and a second sensor signal is generated when the thumb is moved back to expose the sensor. In another embodiment (not shown), the finger-triggered sensor 15 is located in an area where it is normally covered by the thumb but can be exposed by moving the thumb away. A first sensor signal is generated when the thumb is moved to expose the sensor 15, and the second sensor signal is generated when the thumb is moved back to cover the sensor.

In an alternative embodiment, two consecutive finger movements are required to generate a sensor signal. In the mouse 10 shown in FIGS. 1A and 1B where the sensor is normally exposed, a sensor signal is generated when the thumb is moved to cover the sensor 15 and then (within a predefined time period) moved back to exposed the sensor. Similarly, in the mouse 10 where the sensor is normally covered, a sensor signal is generated when the thumb is moved to expose the sensor 15 and then (within a predefined time period) moved back to cover the sensor. Such alternative embodiments prevent accidental triggering of the sensor when the user unintentionally moves his thumb and covers the sensor. In such alternative embodiments, however, only one sensor signal can be generated, whereas the embodiments described in the preceding paragraph can generate a first and a second sensor signal that are distinct.

Figure 4:
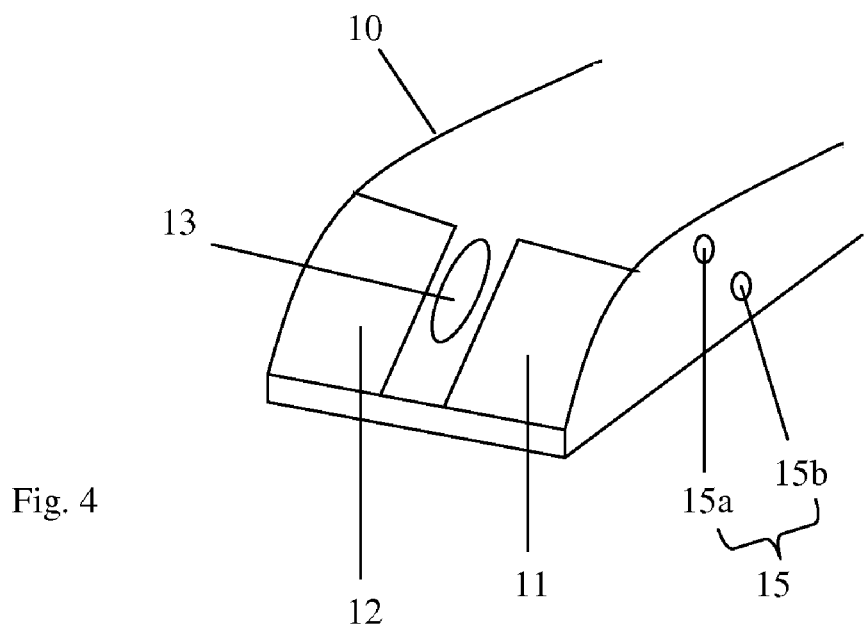
FIG. 4 illustrates a mouse according to yet another embodiment of the present invention.

In yet another embodiment, shown in FIG. 4, the finger-triggered sensor 15 includes two physical sensor parts, 15a and 15b (e.g. two LEDs or two touch-sensitive points), the first being located in an area where it is normally exposed and the second being located in an area where it is normally covered by the thumb. A first sensor signal is generated when the thumb is moved to expose the first sensor part 15a and cover the second sensor part 15b, and the second sensor signal is generated when the thumb is moved back to cover the first sensor part 15a and expose the second sensor part 15b. In other words, a first sensor signal is generated when the first sensor part 15a is exposed within a predefined time interval before or after the second sensor part 15b becomes covered, and a second sensor signal is generated when the second sensor part 15b is exposed within a predefined time interval before or after the first sensor part 15a becomes covered. Compared with a single-part implementation, the two-part sensor implementation is more reliable because it can better prevent undesirable sensor signal being generated by accidental thumb movements.

Alternatively, the embodiments shown in FIGS. 1A, 1B and 4 may be modified such that the sensor 15 is located at a location where it can be covered and exposed by moving another finger of the hand, such as the index finger or the middle finger.

In all three embodiments described above (FIGS. 1A, 1B and 4), the finger-triggered sensor 15 has two states (covered and uncovered), and sensor signals are generated when the state of the sensor changes. The first sensor state may be referred to as a "normal" state, which occurs when the user normally holds the mouse without taking any action to generate a sensor signal; the second state may be referred to as an "action" state, which occurs when the user moves a finger intending to generate a sensor signal. (In a two-part sensor implementation, the state where both parts are covered or both part are exposed is undefined states and may be ignored.) The "normal" and "action" states of the finger-triggered sensor 15 may be thought of as analogous to the un-depressed and depressed state of a click button on a conventional mouse. A first sensor signal is generated when the finger-triggered sensor 15 changes from the first state to the second state, and a second sensor signal is generated when the sensor changes from the second state to the first state. (In an embodiment having two sensor parts, other undefined states may exist in addition to the first and second state, such as when both sensor parts are covered or when both are exposed. In such an embodiment, the sensor signals may be generated when a change from the first state to the second state or vice versa occurs within a predefined time period. Thus, if a change of state is broken by a prolonged period of an undefined state, no signal will be generated.) For convenience, these two sensor signals are referred to as the "sensor-activated" signal and the "sensor-deactivated" signal. They may be thought of as analogous to the button-down and button-up signals (such signals are often referred to as messages by those skilled in the art) generated by depressing and releasing a click button in a conventional mouse. The two sensor signals are preferably different signals (or toggle signals), just like the button-down and button-up signals are two different signals. As described in more detail later, the mouse 10 may be programmed to give the two sensor signals desired meanings.

Figure 5:
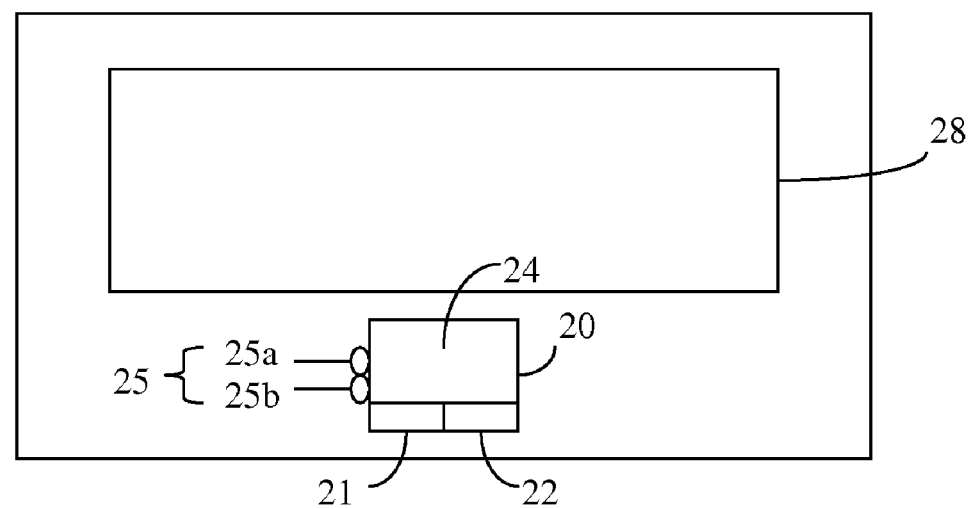
FIG. 5 illustrates a laptop-style keyboard with a touch-sensitive pad and a finger-triggered sensor according to an embodiment of the present invention.

A finger-triggered sensor 15 may be provided on other pointing devices beside a mouse, such as a pointing device of a laptop computer. FIG. 5 shows a portion of a laptop computer with a keyboard 28 and touch-sensitive pad style pointing device 20 provided with a finger-triggered sensor 25 according to an embodiment of the present invention. The pointing device 20 includes a touch-sensitive pad 24, a left button 21, a right button 22 (optional), and a finger-triggered sensor 25 implemented by optical sensors or touch-sensitive sensors located near the touch-sensitive pad 24. The sensor 25 may be located to the left, to the right, above or below the pad 24. The finger-triggered sensor 25 preferably includes two sensor parts 25a and 25b. The first sensor state is defined as when the first sensor part 25a is covered and the second sensor part 25b is exposed, and the second sensor state is defined as when the first sensor part 25a is exposed and the second sensor part 25b is covered. The first sensor signal is generated when the sensor state changes from the first state to the second state within a predefined time interval. The second sensor signal is generated when the opposite occurs.

In lieu of a touch sensitive pad, some laptop computers use other tracking devices such as a TRACKPOINT™ (a button located among keyboard keys, which can be pressed in different directions to effectuate a cursor movement) on a THINKPAD™ laptop computer. The sensor 25 described above can be provided for such a laptop keyboard as well. In addition, the sensor structure shown in FIG. 5 may be provided on external keyboards for desktop or laptop computers. Some external keyboards are equipped with a touch sensitive pad and buttons as a pointing device. The sensor 25 described above can be provided for such a keyboard. The sensor 25 described above can also be provided for a regular keyboard that does not have a pointing device.

Figure 6A:
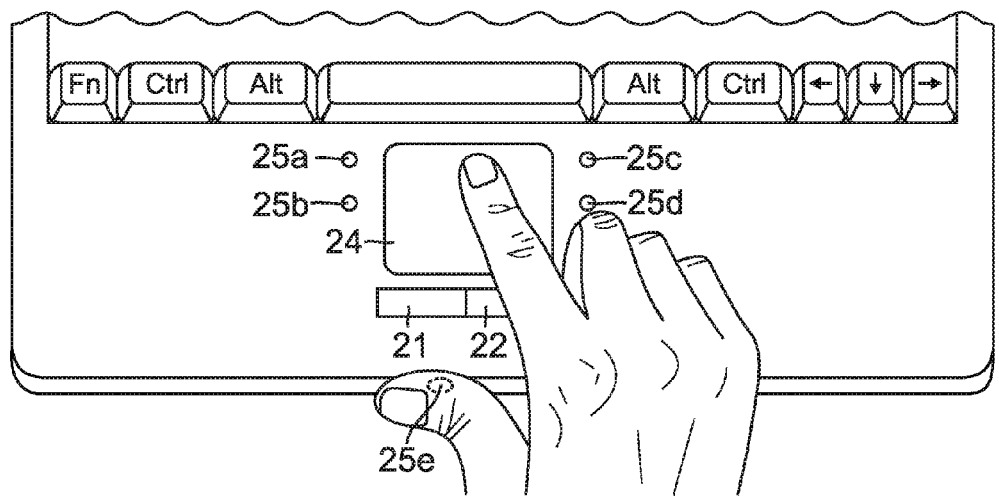
FIGS. 6A and 6B illustrate a laptop-style keyboard with a touch-sensitive pad and a finger-triggered sensor having multiple sensor parts according to another embodiment of the present invention.
Figure 6B:
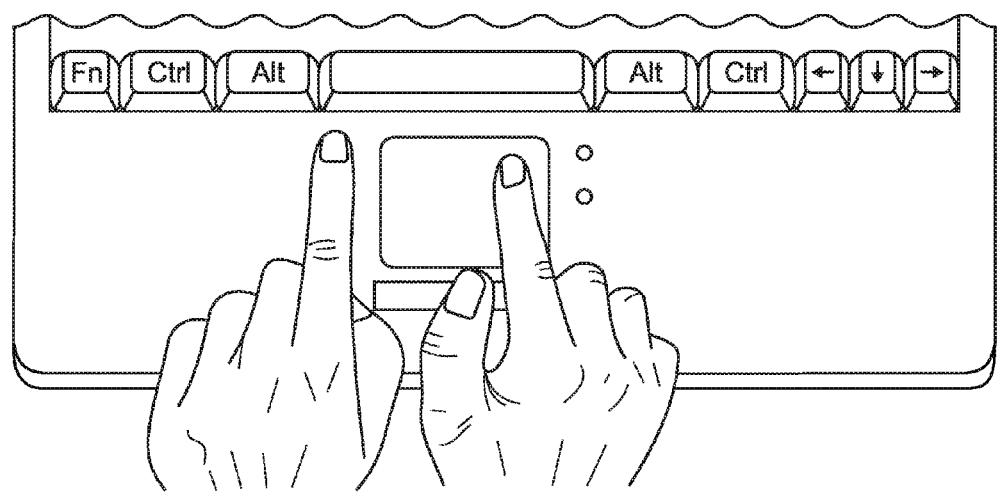

FIGS. 6A and 6B show another embodiment of finger-triggered sensor provided on a pointing device of a laptop computer. Four sensor parts 25a, 25b, 25c and 25d are provided, which collectively constitutes the sensor 25. Two sensor parts are located on each side of the touch pad 24. As shown in FIG. 6B, the user uses a finger on one hand to cover selected sensor parts and uses a finger of another hand to generate movement signals in a normal way. In addition, a fifth sensor part 25e is provided on the edge of the keyboard that can be covered by the thumb of the same hand that is generating the movement signal. The fifth sensor part 25e is shown in FIG. 6A in dashed lines as it is covered by the thumb. By using the fifth sensor part 25e, the user may use the same hand to control both the sensor 25 and generate tracking movement. The tracking device may be programmed so that various sensor parts may be enabled or disabled based on user preference such as whether the user is left-handed or right-handed or whether the user prefers to use the same hand or different hands to perform various tasks.

In another embodiment (not shown), the sensor is provided on a stand-alone device that does not have mouse buttons or scrolling wheel.

The sensor signals generated by the finger-triggered sensor 15 are physical signals distinct from the button signals, scrolling signals and movement signals generated by click buttons 11 and 12, scrolling wheel 13 and movement tracking device 14. The sensor signals (physical signals) may be used in a variety of ways, either alone or in combination with other physical signals generated by other mouse components, to generate a variety of logical signals to be transmitted to the host computer. The meanings of the sensor signals or signal combinations may be defined by the hardware/firmware of the mouse, or they may be programmatically defined by the operating system, the mouse driver program and/or application programs. In particular, the sensor signals may be interpreted as logical signals (messages) that currently exist in conventional mice, so that a mouse implementing a finger-triggered sensor according to embodiments of the present invention can be used in a compatible manner with current conventional mouse drivers, operating systems and application programs. Some examples of how the sensor signals may be interpreted and used are described below.

In a first example, the sensor-activated and sensor-deactivated signals are interpreted as the left button down and left button up messages, respectively, of a conventional mouse. Thus, the sensor can be though of as acting as a left button. This may be implemented in two ways. The first implementation is entirely within the mouse hardware/firmware. The mouse hardware/firmware detects the changes in sensor states, generates the left button down and left button up messages and sends them to the mouse driver on the host computer. The mouse driver is not aware that a sensor instead of a button was involved. An advantage of this implementation is that it requires no change in a conventional mouse driver. One disadvantage of this implementation is that turning on/off the sensor feature can only be done using the mouse hardware and cannot be done from the host computer. The second implementation uses mouse hardware/firmware and modified mouse driver software on the host computer. The mouse hardware/firmware sends sensor signals to the mouse driver on the host computer, and the mouse driver interprets these signals into left button down and left button up messages as appropriate. An advantage of this implementation is that the sensor feature can be turned on/off using software on the host computer. Another advantage of this implementation is that a mouse hook program on the host computer to allow the sensor signals to be used in conjunction with other keyboard or mouse signals to perform various operations, as will be described in more detail later.

In a second example, after a sensor-activated signal is received, at least some mouse movements are required within a predefined time period before a left button down message is generated, otherwise the sensor-activated signal is ignored. This example is safer and easier to use than the first example because if the user activates the sensor by accident and then deactivates it without moving the mouse, then no left click (left button down followed by left button up) messages will be sent to the operating system and/or the active application. This feature is especially advantageous when the sensor is provided on a laptop touch pad or a keyboard equipped with a touch pad mouse. Again, this example can be implemented in two ways. The first implementation is entirely within the mouse hardware/firmware. If the mouse hardware/firmware detects a sensor-activated signals followed by at least some mouse movement signals within a predefined time period, it generates a left button down message and sends it to the mouse driver on the host computer. The second implementation uses mouse hardware/firmware and modified mouse driver software on the host computer. The mouse hardware/firmware sends sensor-activated and sensor-deactivated signals and mouse movement signals it detects to the mouse driver on the host computer. If the mouse driver receives a sensor-activated signal followed by at least some mouse movement signals within a predefined time period, it sends a left button down message to the operating system and/or the active application; otherwise it ignores the sensor-activated signal. The first and second implementations have similar advantages and disadvantages as the first and second implementations of the first example.

It is worth noting that the second example above may be used for a mechanical mouse button, especially an overly sensitive button. In other words, a button down physical signal from such button is ignored unless it is followed by some mouse movement signal, in which case a button down message will be generated.

In a third example, the sensor is a two-part sensor as that shown in FIG. 4. This has certain advantages over one-part sensors shown in FIGS. 1A and 1B. Using a one-part sensor, a left button down message may be accidentally generated when the user initially grabs the mouse, if the grabbing action creates a sequence of covering the sensor followed by a mouse movement. Using a two-part sensor reduces the occurrences of such accidental generation of a left button down message. This example may be implemented in two ways. Again, the first implementation is entirely within the mouse hardware/firmware. The mouse hardware/firmware detects the sensor signals from both sensor parts (and optionally mouse movement signals), generates the left button down and left button up messages and sends them to the mouse driver on the host computer. The second implementation uses mouse hardware/firmware and modified mouse driver software on the host computer. The mouse hardware/firmware sends sensor signals (and optionally mouse movement signals) it detects to the mouse driver on the host computer, and the mouse driver interprets these signals into left button down and left button up messages as appropriate. One advantage of the second implementation is that certain parameters for controlling the generating of the button up/down messages can be made programmable. As described earlier, when using a two-part sensor, the covering of one sensor part and the exposing of the other sensor part should occur within a predefined time period in order to generate a sensor-activated or sensor-deactivated signal. This time period may be made programmable in the second implementations. If the first implementation used, this time period will be predefined by the mouse hardware/firmware.

Figure 10A:
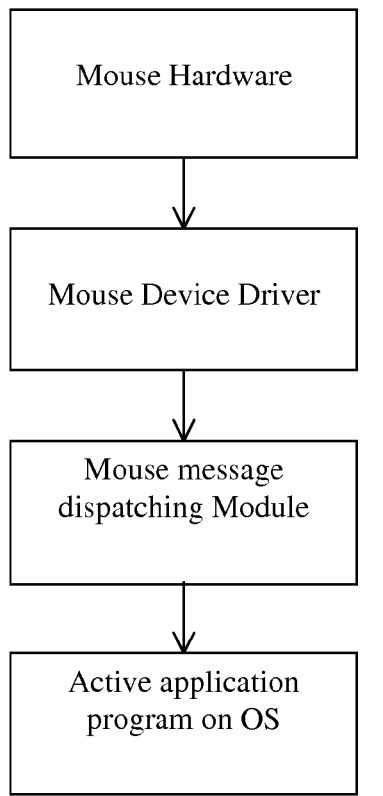
FIGS. 10A and 10B illustrate mouse signal paths from a device driver to active applications.
Figure 10B:
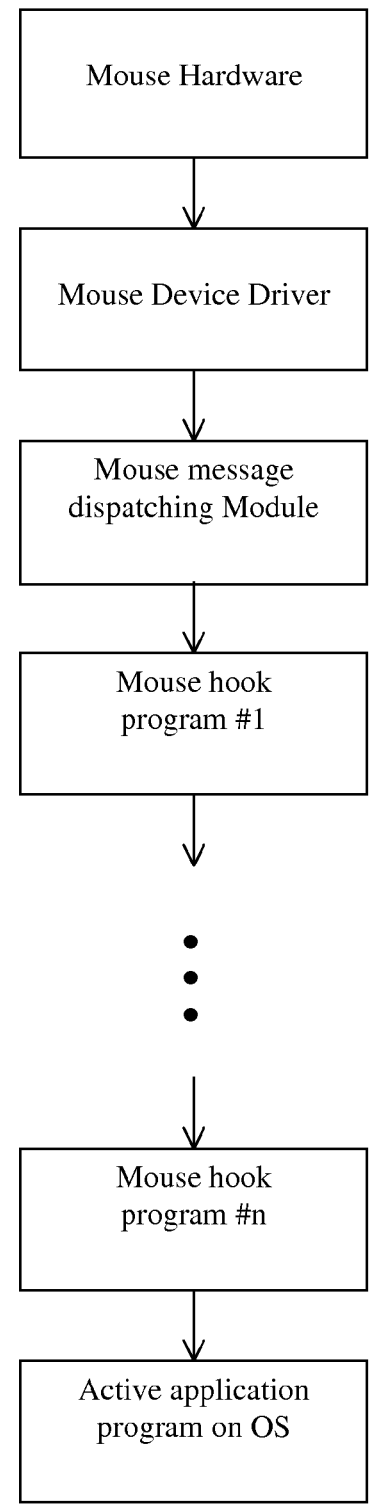

In a fourth example, the sensor signals are used to generate sensor-activated and sensor-deactivated messages for the operating system and/or application programs. These messages are in addition to conventional mouse messages generated by buttons or mouse wheel on a conventional mouse. The sensor-activated and sensor-deactivated messages are routed to the active application software through the same message channels used to route conventional mouse messages to active application program. Those channels are shown in FIG. 10A and FIG. 10B which are described in more detail later. The operating system and/or application programs can make use of the sensor-activated and sensor-deactivated messages to perform functions not offered by a conventional mouse. This example may be implemented in two ways. The first implementation is entirely within the mouse hardware/firmware. The mouse hardware/firmware detects the changes in sensor states, generates the sensor-activated and sensor-deactivated messages and sends them to the mouse driver on the host computer. The second implementation uses mouse hardware/firmware and modified mouse driver software on the host computer. The mouse hardware/firmware sends sensor-activated and sensor-deactivated signals to the mouse driver on the host computer, and the mouse driver interprets these signals, together with other mouse signals such as mouse movement or mouse button signals (optional), to generate sensor-activated and sensor-deactivated messages. An advantage of the second implementation is that it enables the user to configure how the mouse driver interprets the various signals from the mouse. This offers greater flexibility for the user.

In a fifth example, the sensor signals are used to generate sensor-activated and sensor-deactivated messages for the operating system and/or application programs as in the fourth example, but provides for compatibility with programs that do not recognize the sensor-activated and sensor-deactivated messages. In this example, a left button down message is generated immediately following the sensor-activated message, and a left button up message is generated immediately following the sensor-deactivated message. In a program that recognizes the sensor-activated and sensor-deactivated messages, the left button down and left button up messages that immediately follow will be ignored. In a program that does not recognize the sensor-activated and sensor-deactivated messages, the program will be expected to respond normally to the left button down and left button up signals instead. In this way, the mouse can be used in a "backward compatible" manner.

A practical application example, where the sensor signals generated by the finger-triggered sensor 15 are used to perform a drag-and-drop operation, is described below. Using a conventional mouse, dragging and dropping is done by first pointing the mouse pointer to an object (e.g., an icon) to be dragged, pressing the left button, moving the mouse pointer to a desired location while keeping the left button depressed, and releasing the left button when the pointer is at the desired location (e.g., over the target icon). (Note that selecting text or an area of an image may be viewed as a form of dragging.) Sometimes, the user accidentally releases the left button before the pointer reaches the desired location, resulting in the object being dropped in a wrong place. According to an embodiment of the present invention, the finger-triggered sensor may be used to perform dragging and dropping in a more convenient and less error-prone way. More specifically, the user holds the mouse in a normal state, point the mouse pointer to an object to be dragged, then moves the thumb to generate a sensor-activated signal. The user moves the mouse while keeping the thumb at that location until the mouse pointer is at the desired target location, and then moves the thumb back to the normal holding position to generate a sensor-deactivated signal. Such a drag-and-drop operation using the finger-triggered sensor 15 is easy to perform as the user does not need to keep a button depressed. It is more ergonomic and makes the operation more reliable.

Figure 7:
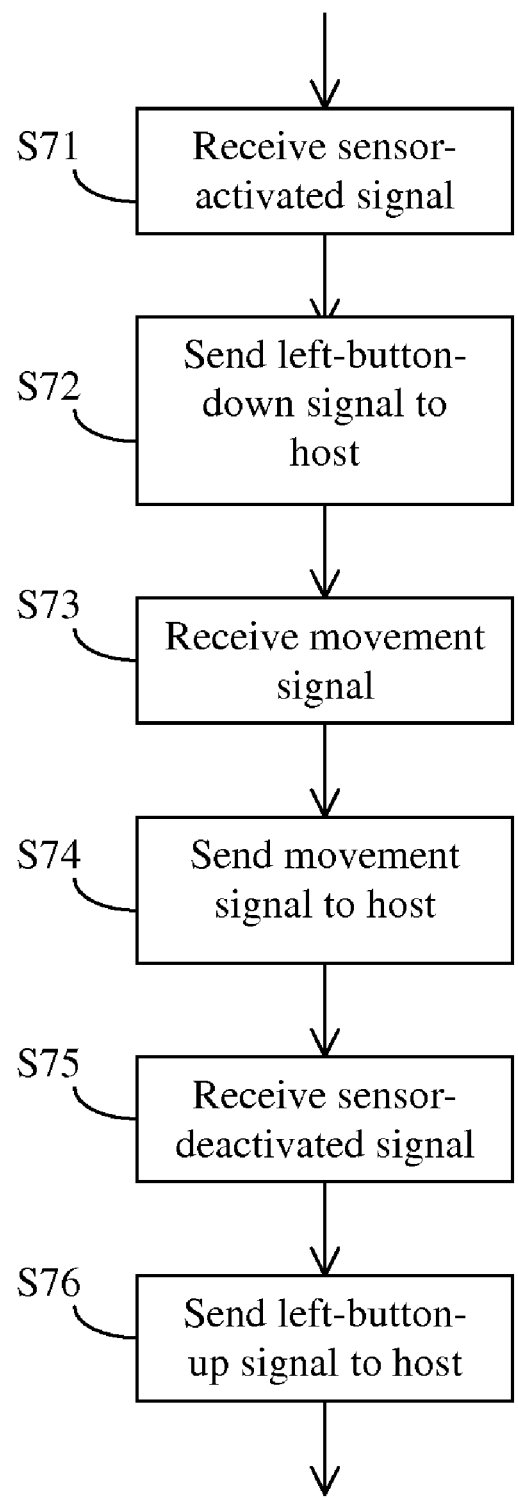
FIG. 7 illustrates a method performed by the mouse control circuit for a drag and drop operation.

FIG. 7 illustrates a method performed by the mouse control circuit 16 in a drag-and-drop operation according to an embodiment of the present invention. When the control circuit 16 receives a sensor-activated signal (step S71), it sends a left-button-down signal (which is a signal generated by a conventional mouse) to the host (step S72). The mouse control circuit 16 then receives movement signals and sends them to the host (steps S73 and S74). When the sensor-deactivated signal is subsequently received (step S75), the control circuit 16 sends a left-button-up signal (which is another signal generated by a conventional mouse) to the host (step S76). In this example, the sensor 15 can be thought of as simulating a left button of a conventional mouse. The sequence of signals received by the host (left-button-down, mouse movement, left-button-up) is identical to the sequence of signals generated by a conventional mouse performing a drag-and-drop operation.

Figure 8:
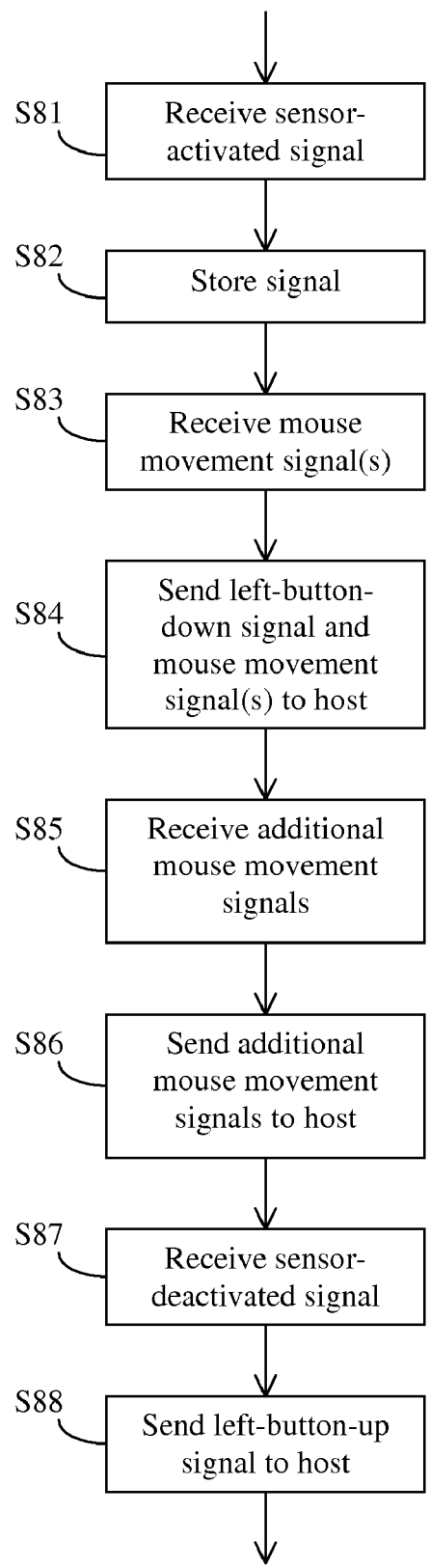
FIG. 8 illustrates another method performed by the mouse control circuit for a drag and drop operation.

FIG. 8 illustrates an alternative method performed by the mouse control circuit 16 in a drag-and-drop operation according to another embodiment of the present invention. When the control circuit 16 initially receives the sensor-activated signal (step S81), it stores a signal (e.g. changes a register value, etc.) (step S82) but does not send any signal to the host computer. When one or more mouse movement signals are subsequently received (step S83), a left-button-down signal (which is a signal generated by a conventional mouse) and the movement signal(s) are sent to the host (step S84). If any additional movement signals are received (step S85) they are sent to the host (step S86). When the sensor-deactivated signal is subsequently received (step S87), the control circuit 16 sends a left-button-up signal (which is another signal generated by a conventional mouse) to the host (step S88). Thus, the sequence of signals received by the host (left-button-down, mouse movement, left-button-up) is identical to the sequence of signals generated by a conventional mouse performing a drag-and-drop operation.

Figure 9:
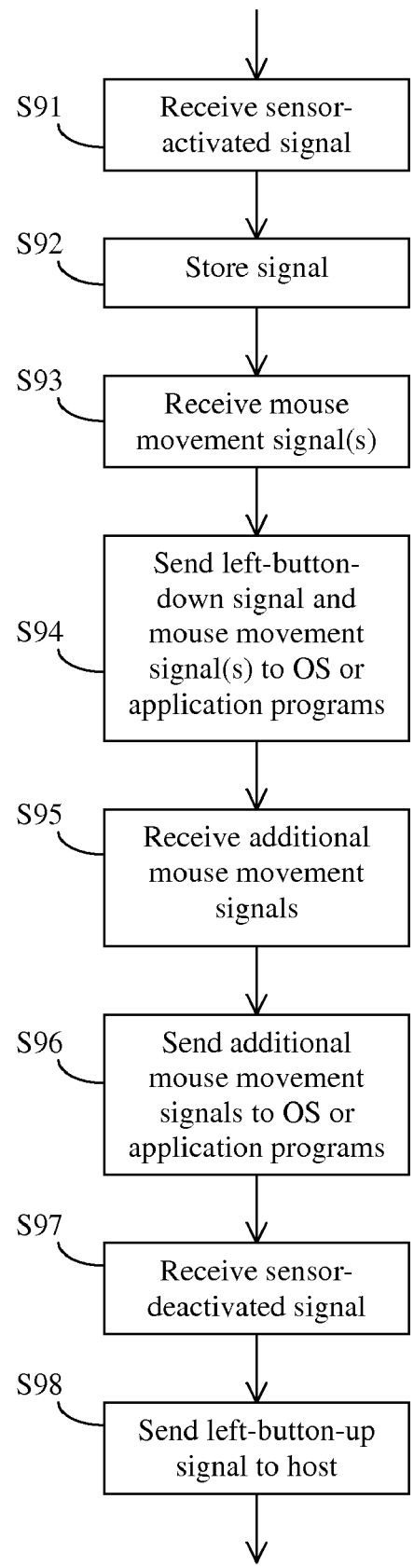
FIG. 9 illustrates a method performed by a mouse driver for a drag and drop operation.

An advantage of using the circuit 16 in the mouse 10 to interpret the sensor signal is that it is compatible with conventional mouse devices, and the mouse driver, application programs and operating system on the host computer do not need to be changed to accommodate the new mouse design. In an alternative embodiment, schematically shown in FIG. 3, the circuit 16 in the mouse transmits logical signals representing sensor-activated and sensor-deactivated events, which are not conventional mouse signals, to the host computer. A mouse driver program 31 on the host computer 30 receives these signals and generates conventional mouse signals (e.g. left-button-down, etc.) for the operating system 32 and/or application programs 33. In other words, the driver program 31 performs steps similar to steps S81 to S88 shown in FIG. 8. This embodiment will require a non-conventional mouse driver to be installed on the host computer. FIG. 9 illustrates the steps of such a method. The steps, which are similar to those in FIG. 8 except that they are performed by the driver program 31 instead of the circuit 16, will not be explained in detail again. To the user, the operating sequence for drag-and-drop is the same as the method shown in FIGS. 7 and 8.

Figure 3:
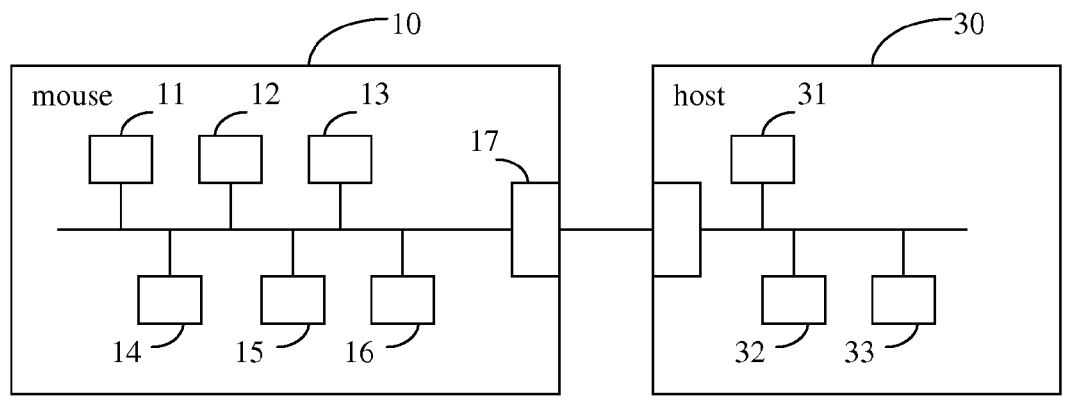
FIG. 3 is a schematic block diagram illustrating the mouse of FIG. 1A connected to a host.

In yet another alternative embodiment, which may also be schematically represented by FIG. 3, the mouse driver program 31 sends the sensor-activated and sensor-deactivated signals to the operating system program and/or application programs to be directly utilized. This embodiment will require certain modifications to conventional operating system programs and/or application programs. An advantage of this embodiment is that it provides more types of mouse signals than are generated by a conventional mouse, which allows the operating system and/or application programs to achieve more flexible control. As the mouse according to embodiments of the present invention gains wider acceptance, it may be expected that the sensor signals will become an integrated part of the operating system and/or application programs.

In the above practical application example, the sensor is used to generate simulated left button down and left button up messages generated by a conventional mouse. As pointed out earlier, the sensor can also be used to generate messages that are not generated by a conventional mouse, therefore enabling application programs to perform more functions. For example, in Adobe® Reader®, currently a "Select Tool" button and a "Snapshot Tool" button are provided on the tool bar to enable the user to select text and select an image area, respectively. If the user clicks the "Select Tool" button, then a dragging sequence using the left mouse button will select text; if the user clicks the "Snapshot Tool" button, then the same dragging sequence will select an image area. Using a mouse with a sensor, a dragging sequence with the sensor may be used to select text, for example, and a dragging sequence with the left mouse button may be used to select an image area. This eliminates the need to click the "Select Tool" and "Snapshot Tool" buttons. As another example, many web browsers such as Internet Explorer use a dragging sequence with the left mouse button to select text, but do not have a way of moving the image within the window using a dragging sequence (as the "Hand Tool" in Adobe® Reader® does). Using a mouse with a sensor, a dragging sequence with the sensor may be used to scroll the image.

In another practical application example, a two-part sensor (see FIG. 5) on a laptop keyboard with a touch pad mouse is used in a dragging process in a way that facilitates easy and precise dragging. When the first sensor part 15a is covered (assuming both sensor parts are normally exposed), a left button down message is generated. If the first sensor part is then exposed immediately, a left button up message is generated to terminate the dragging. This is useful for a short and abrupt dragging process. However, if second sensor part is covered while the first sensor part is still covered, i.e., the user extends the finger to cover both sensor parts simultaneously, then a left click locking mode is engaged. In the left lick locking mode, no left button up message is generated when both sensor parts become exposed, so that the user can carry out a dragging operation by moving the pointer. When one sensor part is covered again (or when any button is clicked), a left button up message is generated to end the dragging process. Such a left click locking mode is useful for lengthy dragging or dragging operations that require precision. In this example, the various messages may be generated by the mouse hardware/firmware or by the host computer.

While a mouse driver program is described in the above examples, a hook program between the mouse driver and the operating system may be employed when appropriate or desired. For example, the meaning of a sensor-activated message may depend on where the mouse cursor is located when the message is generated. Thus, a hook program may be employed so that appropriate messages are sent to appropriate application programs. A mouse driver and a hook program may be collectively referred to as mouse message control software.

FIG. 10A illustrates various components on a mouse signal path from a device driver to active applications when no hook program is installed. The mouse hardware sends mouse signal to a mouse device driver. The mouse device driver software interprets mouse signals into mouse messages such as left button down message, left button up message, right button down message, right button down message, wheel message etc. A mouse message dispatching software module receives mouse messages one at a time generated from mouse device driver, determines which application is to receive the mouse message, and send mouse messages to it. The active application program receives the mouse messages and performs appropriate actions based on the mouse message. FIG. 10B illustrates various components on a mouse signal path from a device driver to active applications when one or more hook programs are installed. The mouse hardware, mouse device driver and the mouse message dispatching module in FIG. 10B are similar to the corresponding components in FIG. 10A. A number of mouse hook programs are interposed between the mouse message dispatching module and the active application program. Each mouse hook program has a chance to process the mouse messages being sent to active applications, either preventing active applications from receiving a message or altering the message. The number of mouse hook programs operate in sequence. The active application program receives mouse messages from the last mouse hook program, and performs appropriate actions based on the mouse message. Note that there can be any number of mouse/keyboard hook program installed on the OS at one time. The last hook program in the series is the most important one because it can override any logic or algorithm implemented by other hook programs before it. Hook programs are widely used; they are useful because they allow a means for controlling mouse or keyboard messages before they are processed by active application. One downside of hook programs is that they can pose security risks.

Note that although only one mouse hardware unit is shown in FIG. 10B, multiple units (mice) may be connected to the computer. One advantage of using a mouse hook program that has knowledge of current sensor state is that, if a computer has connected to it both a conventional mouse and a mouse with a sensor according to the present invention, the signals from both mice can be combined by the mouse hook program to achieve various operations. In other words, it provides a way for the conventional mouse to take advantage of the sensor signals generated by the mouse with the sensor. For example, if a user uses a laptop equipped with a sensor of this invention and there is an external conventional mouse connected to said laptop, then he or she can perform a dragging operation simply by covering the sensor on the laptop while moving the external mouse.

Another advantage of using a mouse hook program is that it can allow the user to selectively decide which applications are to be affected by the sensor-activated and sensor-deactivated messages and which applications are not be effected by these messages. For example, the user may desire not to have some "overly sensitive" application be effected by the sensor-activated and sensor-deactivated messages. To accomplish this, the user specifies which application programs are to be or not to be affected by the sensor-activated and sensor-deactivated messages. Then, when the mouse hook program receives a sensor-activated or sensor-deactivated message, it programmatically checks to see which application is active, and determines whether to forward the messages to the active application based on the user specification. In other words, the mouse hook program can selectively forward the sensor-activated and sensor-deactivated messages to an active application program based on a user-specification of which application programs are to be affected by these messages (see, e.g., step 1209A in FIG. 12B, described in detail later). Note that the device driver cannot accomplish this function because it operates in kernel mode while the mouse hook programs run in user mode.

In yet another embodiment of this invention, the "overly sensitive" application can be affected by sensor-activated and sensor-deactivated signals only when the cursor is located on certain parts of the application window, such as a scrollbar (areas where user can left-click and drag mouse to scroll up/down left/right contents of a window but cannot change the data) or caption bar (area where user can drag application windows around). When the mouse cursor is located on any region of the application where objects can be edited or rearranged, such as the client area of a window where file and folders icons are contained, sensor activated and sensor deactivated signals will not be allowed to have any affects on the said application software.

Figure 11:
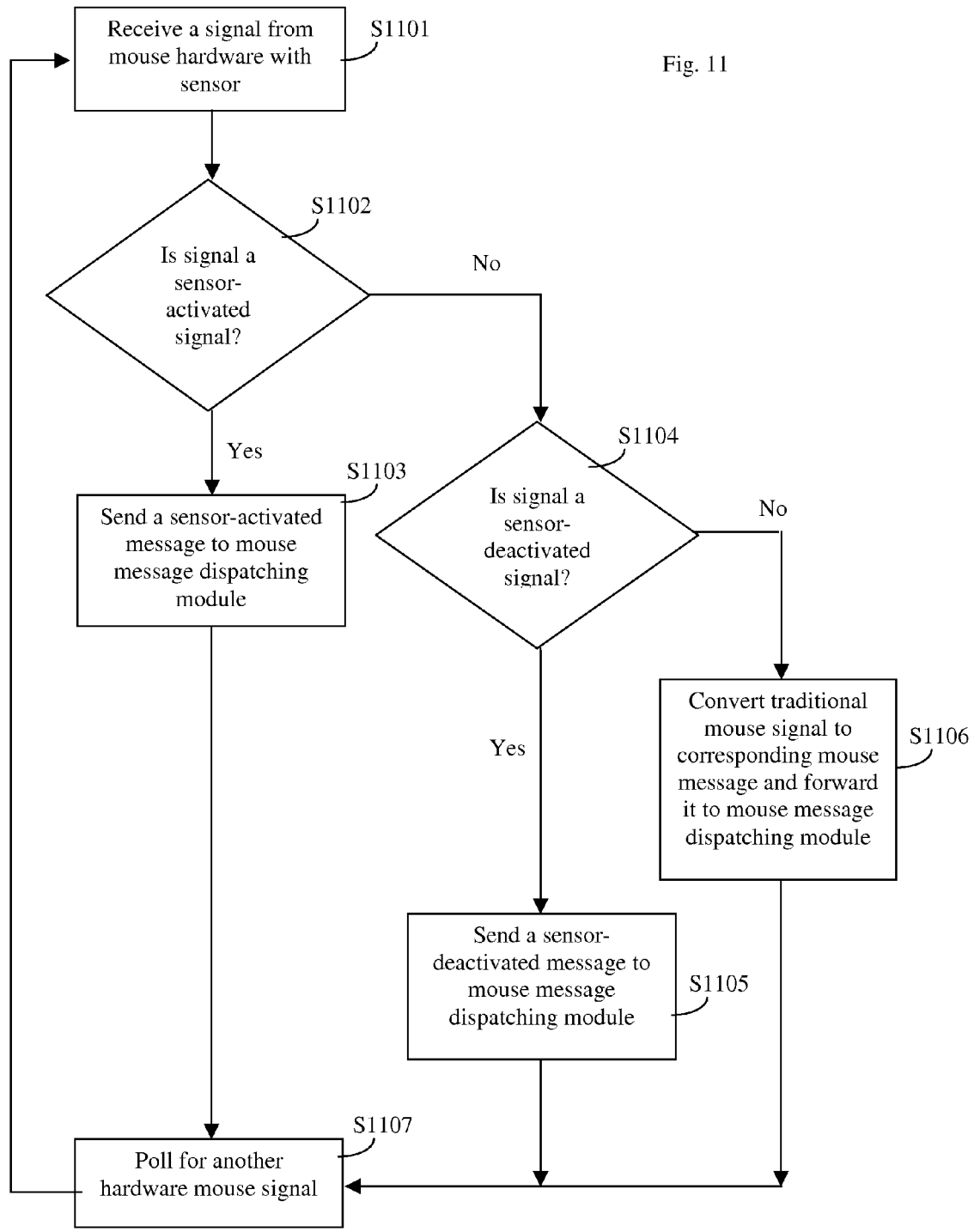
FIG. 11 illustrates an example of a process carried out by a mouse device driver.

FIG. 11 illustrates an example of a process carried out by a mouse device driver on the mouse signal path shown in FIG. 10B. The mouse device driver receives signals from mouse hardware that includes finger triggered sensor, interprets them, and sends messages to the mouse message dispatching module which in turn forwards them to the mouse hook program. More specifically, when the mouse device driver receives a signal from mouse hardware that has a finger triggered sensor (step S1101), if the signal is a sensor-activated signal ("yes" in step S1102), the driver sends a sensor-activated message to the mouse message dispatching module (step S1103). If, on the other hand, the signal is a sensor-deactivated signal ("no" in step S1102 and "yes" in step S1104), the driver sends a sensor-deactivated message to the mouse message dispatching module (step S1105). If the signal received from the mouse hardware is neither a sensor-activated signal nor a sensor-deactivated signal ("no" in step S1104), e.g., the signal is a traditional mouse signal such as a left button signal, a right button signal, a mouse movement signal, or a wheel signal, then it is converted to the corresponding mouse message and is forwarded to the mouse message dispatching module (step S1106). The mouse device driver then polls for another hardware mouse signal (step S1107).

Figure 12A:
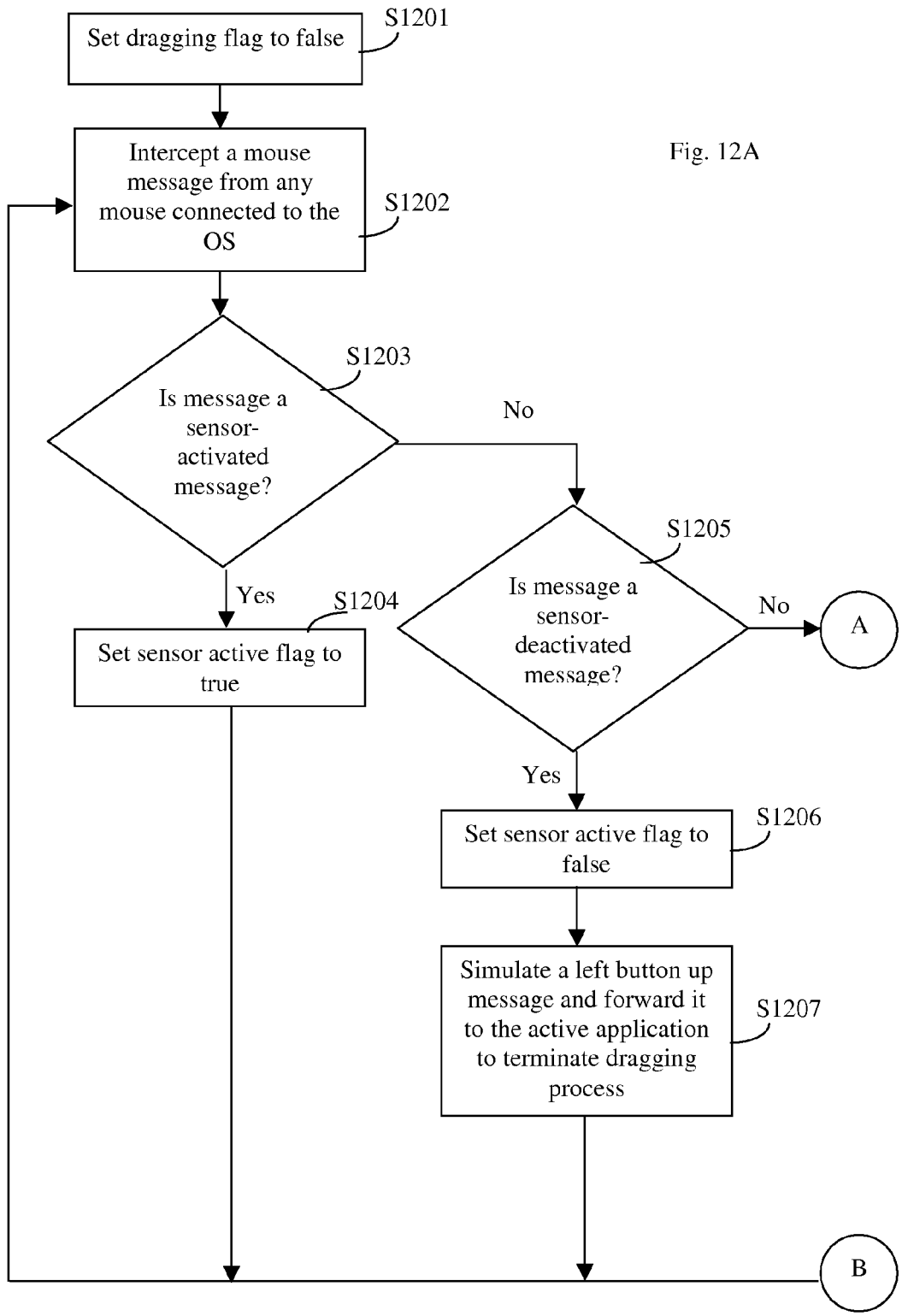
FIGS. 12A and 12B illustrate an example of a process carried out by a mouse hook program in a dragging operation.
Figure 12B:
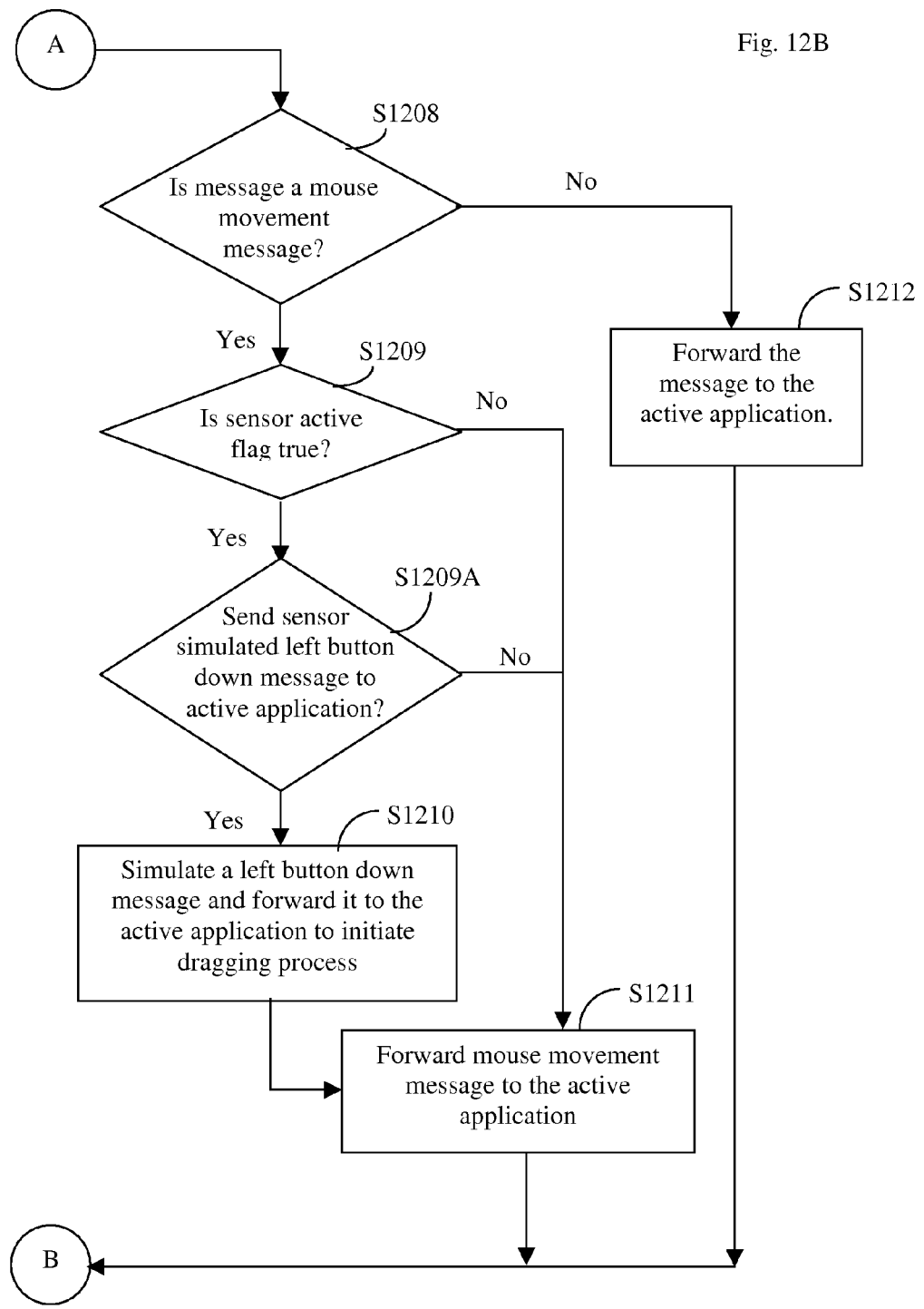

FIGS. 12A and 12B illustrate an example of a process carried out by a mouse hook program in a dragging operation. In this example, the mouse hook program intercepts messages from the message dispatching module, analyzes them to simulate left button down or up messages depending on the sensor state and the timing of mouse movement messages, and forward appropriate messages to the active application. The mouse messages intercepted by the hook program can originate from any mouse connected to the OS. Thus, for example, if two mice are connected to the OS, one with a finger triggered sensor, the other one without, the various signals from the two mice can cooperate to complete a dragging operation. For example, the user may cover the sensor in one mouse, and move the other mouse to accomplish dragging. One of the two mice may be a touch panel on a laptop computer equipped with a finger triggered sensor, for example. In the descriptions below, the term "mouse" is used for convenience, but it should be understood to broadly refer to any suitable pointing device for a computer unless otherwise specified.

As shown in FIGS. 12A and 12B, the mouse hook program initially sets a dragging flag to false (step S1201). It then interprets a mouse message from a mouse (it may be any one of the mice connected to the computer if there are more than one) forwarded via the mouse message dispatching module (step S1202). If the mouse message is a sensor-activated message ("yes" in step S1203), the mouse hook program sets a sensor activation flag to true (step S1204). If, on the other hand, the mouse message is a sensor-deactivated message ("no" in step S1203 and "yes" in step S1205), the mouse hook program sets a sensor activation flag to false (step S1206), and simulates a left button up message and forwards it to the active application to terminate dragging process (step S1207). If the mouse message is neither a sensor-activated message nor a sensor-deactivated message ("no" in step S1205), but is a mouse movement message ("yes" in step S1208), the mouse hook program determines whether the sensor active flag is true (step S1209). If the sensor active flag is true, the mouse hook program further determines whether it should simulate a left button down message and for the active application (step S1209A). This step is optional. As discussed earlier, the user can specify which applications are to be affected by the sensors. The decision in step S1209A is based on whether the active application program is one that the user has specified to be affected or not affected by the sensors. If the decision in step S1209A is affirmative, the mouse hook program simulates a left button down message and forwards it to the active application to initiate a dragging process (step S1210), and then forwards the mouse movement message to the active application (step S1211). If the sensor active flag is false ("no" in step S1209), or if the active program is one that is not to be affected by the sensors ("no" in step S1209A), the mouse hook program simply forwards the mouse movement message to the active application (step S1211). If, in step S1208, the mouse message is not a mouse movement message ("no"), e.g., the message is a traditional left button message, right button message, or a wheel message, the mouse hook program simply forwards the message to the active application (step S1211). After forwarding the message to the application program (i.e. after steps S1207, S1211 and S1212), the mouse hook program goes on to intercept another mouse message.

Figure 13A:
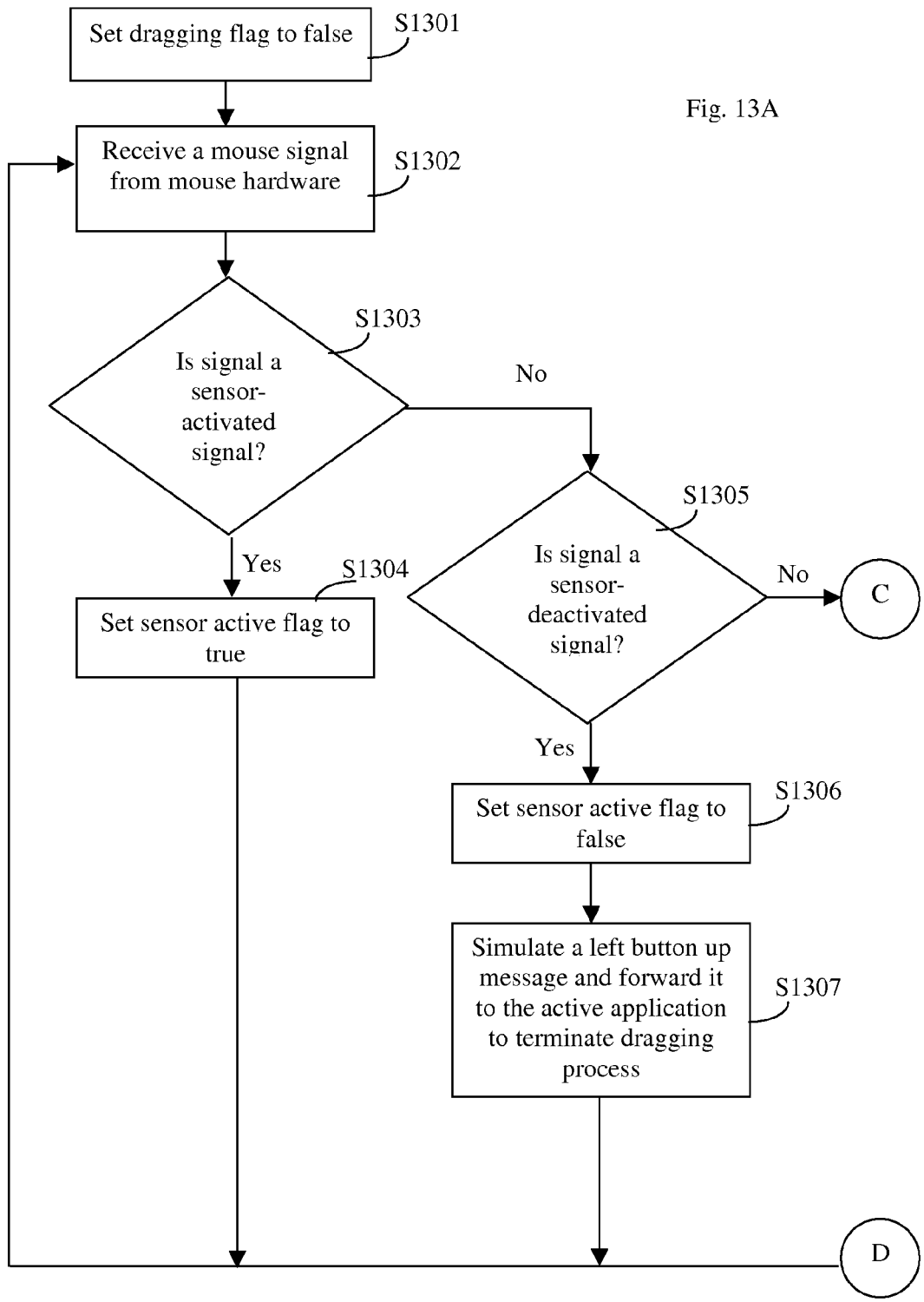
FIGS. 13A and 13B illustrate an example of a process carried out by a mouse device driver in a dragging operation.
Figure 13B:
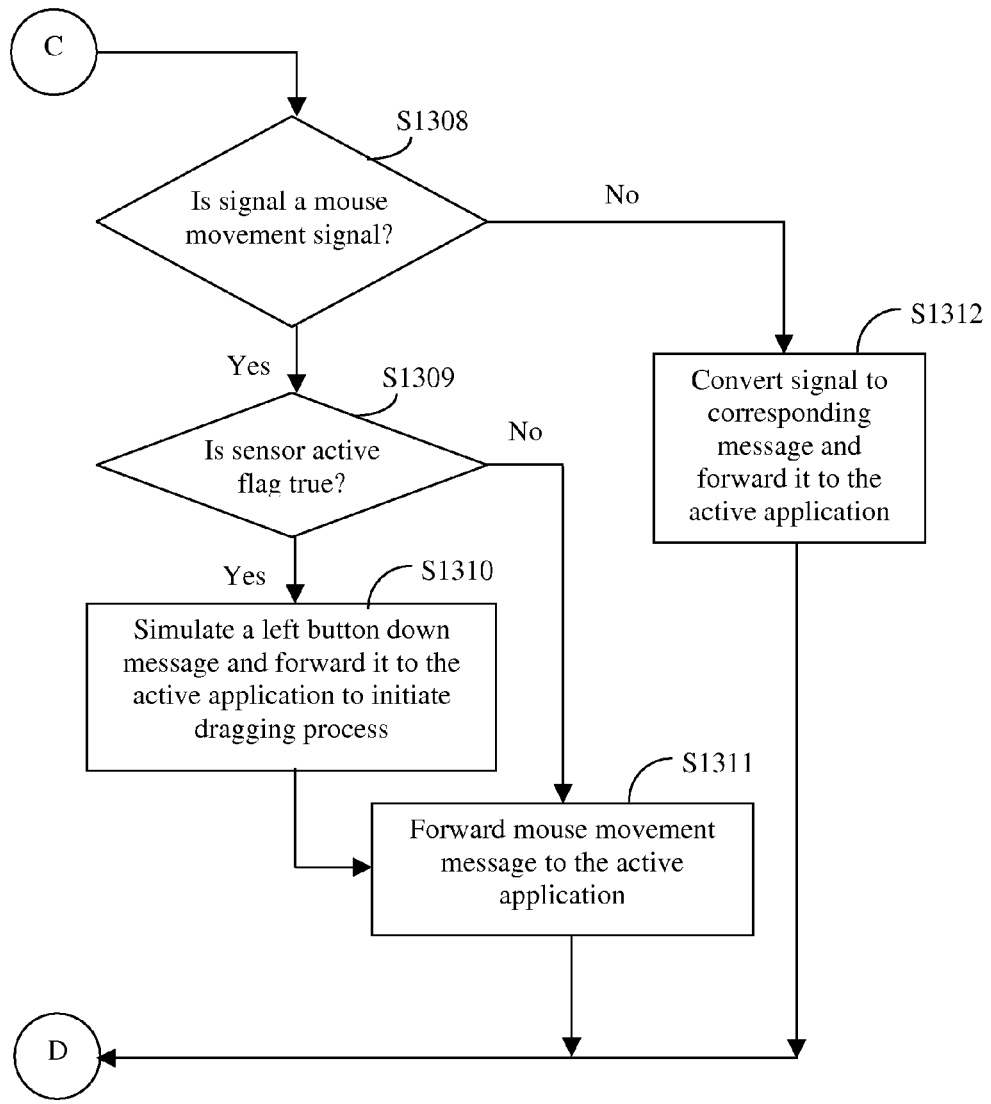

FIGS. 13A and 13B illustrate an example of a dragging operation which is similar to the process shown in FIGS. 12A and 12B, but the steps are performed by the mouse device driver rather than by the mouse hook program as in the case of FIGS. 12A and 12B. Steps S1301 to S1312 are similar to steps S1201 to S1212 in FIGS. 12A and 12B, except that steps S1303, S1305 and S1308 act upon mouse signals received from mouse hardware rather than on mouse messages received from a mouse device driver. In addition, the process in FIG. 13B does not include a decision step corresponding to step S1209A in FIG. 12B. Further, step S1312 includes an operation of converting the mouse signal to a corresponding mouse message. More detailed explanations of FIGS. 13A and 13B are omitted.

Note that each mouse connect to the host PC may have its own device driver and mouse device drivers do not usually interact with one another. Thus, the process shown in FIGS. 13A and 13B does not allow two mice connected to the OS to cooperate with each other in the manner made possible by the process of FIGS. 12A and 12B.

It is noted that while the above examples shown in FIGS. 11, 12A, 12B and 13A, 13B are useful for processing signals that originate from a mouse having a finger triggered sensor, the same methods can also be used to process special signals originating from a different kind of mouse, such as a mouse having a special button different from the traditional left and right buttons. To implement such methods, FIGS. 12A, 12B and 13A, 13B only need to be modified slightly to change "sensor-activated signal/message" to "special button down signal/message", to change "sensor-deactivated signal/message" to "special button up signal/message", and to change "sensor active flag" to "special button active flag", etc. More detailed descriptions are omitted.

As shown in FIG. 1A, a switch 19 may be provided on the mouse 10 to turn the sensor on or off. Alternatively or in addition to the switch 19, in the implementations where the mouse hardware/firmware sends sensor signals to the host computer and the mouse driver on the host computer interpret these signals into appropriate messages, the mouse driver may be configured to turn the sensor features on or off.

It will be apparent to those skilled in the art that various modification and variations can be made in the mouse with a finger triggered sensor of the present invention without departing from the spirit or scope of the invention. Thus, it is intended that the present invention cover modifications and variations that come within the scope of the appended claims and their equivalents.

What is claimed is:

1. A system comprising a computer input device and a host computer connected to the computer input device,
the computer input device comprising:
a device movement tracking mechanism for tracking movement of the computer input device or movements relative to the computer input device;
one or more buttons capable of being triggered by being depressed by a finger;
a sensor capable of being triggered by movements of one or more fingers of a user's hand relative to other fingers of the hand while using the input device with the hand; and
a control circuit coupled to the device movement tracking mechanism, the buttons and the sensor, wherein the control circuit generates movement signals based on movements tracked by the device movement tracking mechanism, generates button down and button up signals based on states of the buttons, and generates sensor-activated and sensor-deactivated signals based on states of the sensor;
wherein the device movement tracking mechanism, the one or more buttons, the sensor and the control circuit are contained within a single common housing, and
the host computer comprising a control section for receiving the movement signals, the button down and button up signals and the sensor-activated and sensor-deactivated signals from the control circuit of the computer input device, for generating sensor-activated and sensor-deactivated messages based exclusively on one or more of the movement signals, the button down signals, the button up signals, the sensor-activated signals and the sensor-deactivated signals received from the control circuit of the computer input device, and for forwarding the sensor-activated and sensor-deactivated messages to an application program or a hook program of the host computer via a message channel of the host computer,
wherein the control section of the host computer generates a sensor-activated message only upon receiving from the computer input device a sensor-activated signal followed by at least one movement signal.

2. The system of claim 1,
wherein in response to receiving the button down and button up signals, the control section of the host computer generates corresponding button down and button up messages, and
wherein the sensor-activated message is the same as the button down message, and the sensor-deactivated message is the same as the button up message.

3. The system of claim 1,
wherein in response to receiving the button down and button up signals, the control section of the host computer generates corresponding button down and button up messages, and
wherein the sensor-activated message is different from the button down message, and the sensor-deactivated message is different from the button up message.

4. A method implemented in a host computer, the host computer being connected to a computer input device, the computer input device comprising a device movement tracking mechanism for tracking movements of the computer input device or movements relative to the computer input device, one or more buttons capable of being triggered by being depressed by a finger, a sensor capable of being triggered by movements of one or more fingers of a user's hand relative to other fingers of the hand while using the input device with the hand, and a control circuit coupled to the device movement tracking mechanism, the buttons and the sensor, wherein the control circuit generate movement signals based on movements tracked by the device movement tracking mechanism, generates button down and button up signals based on states of the buttons, and generates sensor-activated and sensor-deactivated signals based on states of the sensor, the method comprising:
receiving the movement signals, the button down and button up signals and the sensor-activated and sensor-deactivated signals from the control circuit of the computer input device;
generating sensor-activated and sensor-deactivated messages based exclusively on one or more of the movement signals, the button down signals, the button up signals, the sensor-activated signals and the sensor-deactivated signals received from the control circuit of the computer input device, including generating a sensor-activated message only upon receiving from the computer input device a sensor-activated signal followed by at least one movement signal; and forwarding the sensor-activated and sensor-deactivated messages to an application program or a hook program of the host computer via a message channel of the host computer.

5. The method of claim 4,
wherein the sensor-activated and sensor-deactivated messages are forwarded to a hook program; and
the method further comprising:

the hook program selectively forwarding the sensor-activated and sensor-deactivated messages to one of a plurality of active application programs of the host computer based on a user specification that specifies which application programs are to be affected by the sensor-activated and sensor-deactivated messages.

6. The method of claim 5, wherein the user specification further specifies conditions under which an application is to be affected by the sensor-activated and sensor-deactivated messages, one of the conditions being whether a mouse cursor is located on a predefined part of a window of the application.

\* \* \* \* \*